(No Model.)

H. A. GOLL.
OVAL ANGULAR VALVE.

No. 386,461. Patented July 24, 1888.

Witnesses.
Albert H. Rice.
William H. Goll.

Inventor.
Henry A. Goll.

UNITED STATES PATENT OFFICE.

HENRY A. GOLL, OF CHICAGO, ILLINOIS.

OVAL ANGULAR VALVE.

SPECIFICATION forming part of Letters Patent No. 386,461, dated July 24, 1888.

Application filed March 30, 1887. Serial No. 233,091. (No model.)

*To all whom it may concern:*

Be it known that I, HENRY A. GOLL, a citizen of the United States, residing at 338 West Van Buren street, in the city of Chicago, in the county of Cook and State of Illinois, have invented a new and useful Valve, of which the following is a specification.

My invention relates to a swinging valve for a circular cylinder-pipe, and which is arranged in such a manner that it cannot get wedged against the sides of said pipe and that it will open or close the pipe in which it is hung without the aid of springs, rods, levers, &c.

My invention consists in an automatic beveled oval angular valve, which is hung in the center of a circular pipe as ordinarily in use, and which will open said pipe to any pressure of steam or fluids of any kind from one side, S. only, or open the pipe to a suction from one side, D, only, and as soon as said pressure or suction has ceased said valve will close the pipe again and keep it closed by its own weight, thereby preventing anything from going the other way, (from D toward S.) The valve is automatic. It requires no handling or watching.

Figure 1:
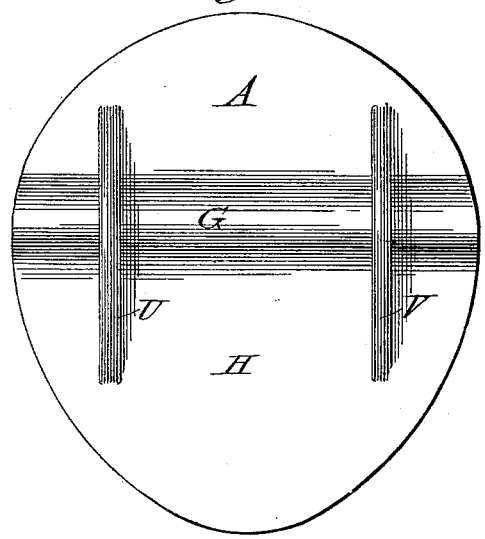
Figure 2:
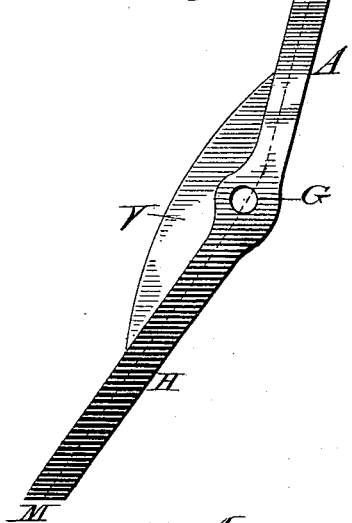
Figure 3:
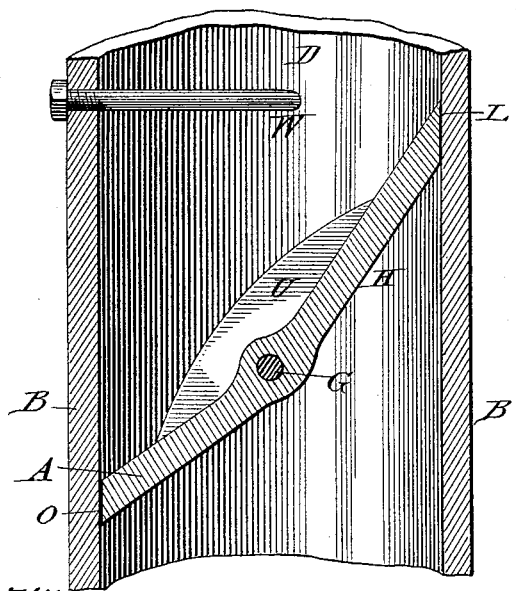
Figure 4:
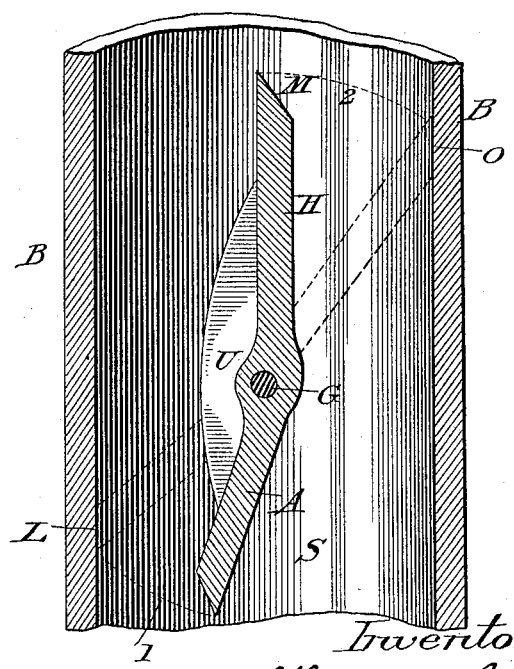

In the drawings, Figure 1 is a front view of my invention. Fig. 2 is a side view of my invention. Fig. 3 is a sectional view of my invention, showing the pipe closed. Fig. 4 is a sectional view of my invention, showing the pipe open.

B, Figs. 3 and 4, represents sections of a circular pipe as ordinarily in use, in which my invention—the automatic swinging beveled oval angular valve—is hung in the center thereof by means of a rod or otherwise, according to the position, thickness, and material of said pipe, in such a manner that the valve will swing on the bearing G. It must also be fitted so that the wings are in a slanting position with the bore of said pipe. When said pipe is closed, (shown in Fig. 3,) the valve must also be fitted so that the wing H is above the bearing G and the wing A below the bearing G; or, as shown in Fig. 4, the wing H must be to the right (D) of the bearing G and the wing A to the left (S) of the bearing G, and the valve must also be fitted and hung so that it will open and close said pipe freely for the purpose as herein described.

The part S of said pipe B can be applied to any chamber where a pressure of steam or fluids of any kind are to go only one way (from S toward D) and prevent anything going the other way, (from D toward S.) To attain this object, said beveled oval angular valve is fitted to and hung in said pipe.

The valve has two wings, H and A, which meet at G, and the valve, when hung and fitted to said pipe, as mentioned, will have beveled edges all around except at G, (shown on the drawings,) and as said valve is a swinging valve and hung in the center of said pipe the bevel on the wing H is on the opposite side of that on the wing A. The valve by means of said beveled edges will fit the pipe close when it is closed, and at the same time said valve will open the pipe freely, and, as the pipe is a circular pipe, the valve being oval, said valve cannot get wedged against the pipe whether it is opened or closed.

The valve is angular. The points M G K form an obtuse angle. The valve, by being of an obtuse angular shape, whether of more or less degree, as shown on the drawings, will when fitted to the circular pipe and hung as mentioned also have an oval form. One wing (the wing H) will be longer and also have a larger area than the wing A, and if said wings are of about the same thickness the wing H will also be heavier than the wing A. The seat is all around the edge of said valve and is, like the valve, beveled, oval, and angular. The valve, being constructed and hung in said circular pipe, will keep the pipe closed by means of its own weight, and the beveled oval angular seat, for the purpose as mentioned, until an even pressure of steam, &c., coming from S against the valve, causes it to open said pipe. Said pressure, acting against both wings H and A, will compel the wing H, with its increased area, to turn toward D and the center of said pipe B, and the smaller wing, A, by being overpowered by the larger wing, H, will turn toward S and the center of said pipe, thereby causing two passages. (Shown in Fig. 4.) Said passages are straight on one side (the pipe's side) and obtuse angular on the other side, (the valve's side,) caused by said valve being angular and remaining in said cylindrical pipe, whether the pipe is open or closed.

Said pressure of steam, &c., will then pass around said valve and through said openings and finally out at D. When said pressure has ceased coming from S, the valve will close the pipe again by its own weight for the purpose as mentioned. A suction at D will operate said valve in the same manner as mentioned and open the pipe, as shown in Fig. 4. A pressure from D or a suction at S will not open but keep the pipe closed, as shown in Fig. 3.

The valve, Fig. 2, can be curved or straight; but to work as specified the wing H must be heavier than the wing A, and the points M G K must be in an obtuse angular position, and in such a manner that if two straight lines of different lengths are drawn—one from M to G and one from K to G—an obtuse angle of no less than one hundred and forty degrees is formed. (Shown in Fig. 2 in dotted lines.)

The pin W is for the purpose that the valve will not overbalance itself if said pipe is in a perpendicular position. On a horizontal or slanting pipe it is not required.

The ribs V are only for the purpose of strengthening the valve.

Operation: To show the operation of the automatic beveled oval angular valve in a circular cylinder-pipe, fit and hang the valve, as herein described, in an exhaust-pipe of a locomotive or steam engine, with the larger wing toward the nozzle, and the valve will close said pipe by means of its own weight. As soon as the locomotive is set in motion by its own steam the exhaust-steam coming from the cylinder will flow toward the nozzle. On its way said steam will come against the valve, and the valve, by having the wings of different area, will easily open said pipe, no matter how weak or how strong said pressure is, so as not to cause any back-pressure. Said steam will then pass around the valve and through the passages between the valve and the pipe, and finally out of the exhaust-nozzle. As soon as the exhaust-steam has ceased coming from the cylinder, the valve will close the pipe again by its own weight and prevent ashes, cinders, &c., which can fall in or be drawn in by the suction of the piston in the cylinder, from going farther than where the automatic valve is hung, thereby preventing the wearing of the slide-valve, valve-seat, piston, and cylinder by means of said ashes, cinders, &c.

Having thus fully described my invention, what I claim, and desire to secure by Letters Patent, is—

For a circular cylinder pipe or passage, the swinging valve, the valve being oval angular, having an oval angular seat hung diametrical in said pipe on the bearing G, fitting said pipe or passage, and having the wings of unequal length, size, weight, and area, the passages controlled by the valve, substantially as described, and for the purpose as specified.

HENRY A. GOLL.

Witnesses:
ALBERT H. RICE,
H. E. PITCHER.